United States Patent Office 3,028,387
Patented Apr. 3, 1962

3,028,387
DIALKYLAMINOALKYLAMINOPTERIDINE DERIVATIVES
Joseph Weinstock, Phoenixville, Pa., assignor to Smith Kline & French Laboratories, Philadelphia, Pa., a corporation of Pennsylvania
No Drawing. Filed Apr. 21, 1961, Ser. No. 104,517
4 Claims. (Cl. 260—251.5)

This invention relates to novel dialkylaminoalkylaminopteridine derivatives having diuretic activity.

The dialkylaminoalkylaminopteridine derivatives of this invention are represented by the following fundamental formula:

FORMULA I

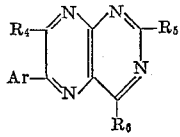

when:
Ar represents phenyl, tolyl, methoxyphenyl, fluorophenyl or thienyl;
two of $R_4$, $R_5$ and $R_6$ represent amino and one of $R_4$, $R_5$ and $R_6$ represents

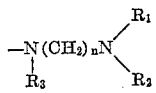

$R_1$ and $R_2$ represent lower alkyl having 1–3 carbon atoms or, when taken together with the nitrogen atom to which they are attached, represent N-pyrrolidinyl, piperidino, morpholino or N-methylpiperazinyl;

$R_3$ represents hydrogen or methyl; and
$n$ represents the integer 2 or 3.

The preferred compounds of this invention are those in which $R_6$ is dialkylaminoalkylamino and $R_4$ and $R_5$ are amino.

Advantageous compounds of this invention are represented by the following formula:

FORMULA II

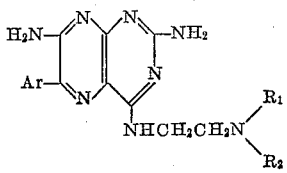

when:
Ar is phenyl or thienyl and
$R_1$ and $R_2$ are methyl or ethyl.

A particularly advantageous compound is 2,7-diamino-4-diethylaminoethylamino-6-phenylpteridine.

The dialkylaminoalkylamino group in Formula I may be in the 2 or 7-position as well as in the 4-position. The resulting compounds are equivalent to the 4-dialkylaminoalkylamino derivatives of Formula I and are a part of this invention.

The 4-dialkylaminoalkylaminopteridines of this invention are prepared by condensing a 2,6-diamino-4-dialkylaminoalkylamino-5-nitrosopyrimidine with an arylacetonitrile according to the following formula:

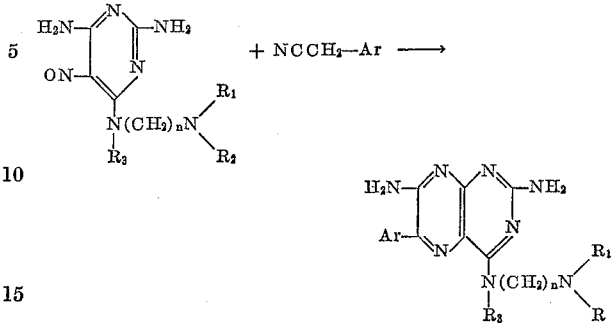

The terms Ar, $R_1$, $R_2$, $R_3$ and $n$ are as previously defined. The reaction is carried out by heating, conveniently at reflux temperature, in a solvent such as for example, ethoxyethanol, t-butanol or, preferably, dimethylformamide in the presence of an alkali metal alkoxide such as potassium t-butoxide, sodium methoxide or sodium ethoxide. The reaction is run for a period of about 20 to 60 minutes. The reaction mixture is concentrated, treated with water and the solid product is isolated by filtration. The product may be purified by recrystallization from a suitable solvent such as isopropanol or butanol to give the dialkylaminoalkylaminopteridines of this invention.

The 2,6-diamino-4-dialkylaminoalkylamino-5-nitrosopyrimidine starting material is prepared by heating 2,6-diamino-4-chloropyrimidine with an excess of the appropriate dialkylaminoalkylamine for about 3–6 hours. The excess amine is removed in vacuo and the residue is 2,6-diamino-4-dialkylaminoalkylaminopyrimidine.

Treating the above prepared pyrimidine in acetic acid solution with sodium nitrite at about 70–80° C. for about 2–5 minutes, then basifying and filtering gives the 2,6-diamino-4-dialkylaminoalkylamino-5-nitrosopyrimidine starting material.

The compounds of this invention in which the dialkylaminoalkylamino group is in the 2-position are prepared as above using the corresponding 4,6-diamino-2-dialkylaminoalkylamino-5-nitrosopyrimidine starting material prepared as follows:

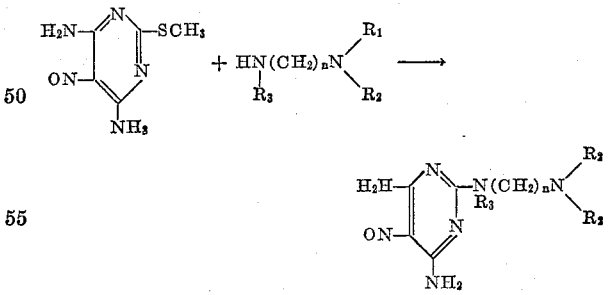

The terms Ar, $R_1$, $R_2$, $R_3$ and $n$ are as previously defined.

The above reaction is carried out in an alcohol solvent such as isopropanol or butanol at elevated temperature conveniently at reflux temperature for about 20–60 minutes. Concentration of the reaction mixture and recrystallization of the residue from a suitable solvent such as aqueous ethanol gives the 2-dialkylaminoalkylaminopyrimidine intermediate which is condensed as described above with an acrylacetonitrile to give the 4,7-diamino-2-dialkylaminoalkylamino-6-arylpteridines of this invention.

The 7-dialkylaminoalkylaminopteridines of this invention are prepared as follows:

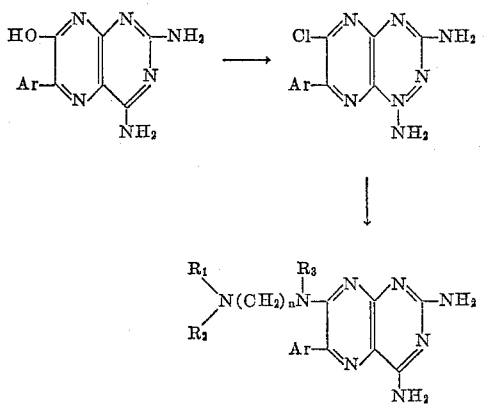

The terms Ar, $R_1$, $R_2$, $R_3$ and $n$ are as previously defined.

The known 2,4-diamino-6-aryl-7-hydroxypteridine starting material is converted to the corresponding 7-chloropteridine by heating, conveniently at reflux, with phosphorus pentachloride and phosphorus oxychloride for about 2–3 hours. The reaction mixture is concentrated, treated with cold water and filtered to give the hydrochloride salt of the 7-chloropteridine intermediate. The free base is prepared by dissolving the salt in ethanol and neutralizing by passing ammonia gas through the solution.

The 7-chloropteridine is reacted with an excess of the appropriate dialkylaminoalkylamine in a suitable solvent such as dimethylformamide or ethoxyethanol at about 50–90° C. for about ½–3 hours. The reaction mixture is concentrated and the 7-dialkylaminoalkylaminopteridine is isolated by filtration.

The following examples are not limiting but are illustrative of the compounds of this invention and of the procedures for their preparation.

*Example 1*

A mixture of 5 g. of 2,6-diamino-4-chloropyrimidine and 10 ml. of (β-diethylamino)ethylamine is heated at reflux for five hours. The excess (β-diethylamino)ethylamine is removed in vacuo and the residual oil is dissolved in 10% aqueous hydrochloric acid. The solution is filtered, and the filtrate is saturated with sodium hydroxide. There is obtained 2,6-diamino-4-(β-diethylamino)ethylaminopyrimidine which separates as a yellow oil.

A solution of 7 g. of crude 2,6-diamino-4-(β-diethylamino)ethylaminopyrimidine in 100 ml. of 10% aqueous acetic acid is stirred and heated (70–80° C.) as a solution of 2.76 g. of sodium nitrite in 10 ml. of distilled water is added dropwise thereto. The addition of the sodium nitrite solution is continued until the reaction gives a positive test for nitrous acid as indicated by starch-iodide test paper. The hot solution is then stirred for two to three minutes before cooling and filtering. The filtrate is further cooled as its pH is adjusted to 9. The solid is separated and washed with water. There is obtained 2,6-diamino-4-(β-diethylamino)ethylamino-5-nitrosopyrimidine as bright pink crystals, M.P. 200° C. (dec.).

A solution of 2 g. of 2,6-diamino-4-(β-diethylamino)ethylamino-5-nitrosopyrimidine in 100 ml. of hot, dry dimethylformamide is prepared and is mixed with 0.5 g. of sodium methoxide and 1.2 g. of phenylacetonitrile. The combined mixture is heated at reflux for 45 minutes.

The solvent is removed in vacuo and the residue stirred with water. The solid is separated and recrystallized twice from isopropanol and twice from butanol. There is obtained 2,7-diamino-4-(β-diethylamino)ethylamino-6-phenylpteridine as bright, yellow crystals, M.P. 160° C. dec.

An aqueous suspension of the above prepared pteridine is treated with an equivalent amount of hydrochloric acid and the water is removed in vacuo to leave the hydrochloride salt. Similarly by treating with sulfuric acid, the sulfate salt is obtained.

*Example 2*

To a solution of 7.5 g. of 2,6-diamino-4-(β-diethylamino)ethylamino-5-nitrosopyrimidine in 250 ml. of refluxing dimethylformamide is added 5.0 g. of m-methoxyphenylacetonitrile. The refluxing is stopped and 1.5 g. of anhydrous sodium methoxide is added and the mixture is refluxed for one hour. Concentrating, adding water, filtering and recrystallizing the resulting solid gives 2,7-diamino - 4-(β-diethylamino)ethylamino - 6-(m-methoxyphenyl)pteridine. Similarly using 4.5 g. of p-tolylacetonitrile or o-tolylacetonitrile in the above reaction procedure, 2,7-diamino-4-(β-diethylamino)ethylamino-6-(p-tolyl)pteridine and the corresponding 6-(o-tolyl)pteridine respectively are obtained.

*Example 3*

Refluxing 10 g. of 2,6-diamino-4-chloropyrimidine with excess (β-dimethylamino)ethylamine and working up as in Example 1 gives 2,6-diamino-4-(β-dimethylamino)ethylaminopyrimidine which is treated with sodium nitrite in acetic acid solution to give 2,6-diamino-4-(β-dimethylamino)ethylamino-5-nitrosopyrimidine.

A solution of 5.0 g. of the above prepared pyrimidine in 150 ml. of dry dimethylformamide is treated with 1.2 g. of sodium methodixe and 2.5 g. of phenylacetonitrile. The resulting mixture is refluxed for 40 minutes, then the solvent is removed in vacuo and the residue is stirred with water. Filtering and recrystallizing the product from isopropanol gives 2,7-diamino-4-(β-dimethylamino)ethylamino-6-phenylpteridine.

In a similar manner, refluxing 2,6-diamino-4-chloropyrimidine with excess (β-dimethylamino)propylamine, nitrosating the resulting 2,6-diamino-4-(β-dimethylamino)propylaminopyrimidine and condensing the thus formed 2,6-diamino - 4-(β-dimethylamino)propylamino-5-nitrosopyrimidine with phenylacetonitrile as described above gives 2,7-diamino - 4-(β-dimethylamino)propylamino-6-phenylpteridine.

*Example 4*

A mixture of 2.8 g. of 2,6-diamino-4-(β-dipropylamino)ethylamino-5-nitrosopyrimidine, prepared from (β-dipropylamino)ethylamine as in Example 1, 1.5 g. of p-fluorophenylacetonitrile, 0.6 g. of sodium methoxide in 100 ml. of ethoxyethanol is heated at reflux for one hour. Removing the solvent in vacuo, adding water, filtering and recrystallizing the product from butanol gives 2,7-diamino - 6-(p-fluorophenyl)-4-(β - dipropylamino)ethylaminopteridine.

*Example 5*

A solution of 7.5 g. of 2,6-diamino-4-(β-diethylamino)ethylamino-5-nitrosopyrimidine in 200 ml. of dimethylformamide is treated with 1.6 g. of sodium methoxide and 3.8 g. of 2-thienylacetonitrile. The resulting mixture is refluxed for one hour. Working up as in Example 1 gives 2,7-diamino-4-(β-diethylamino)-ethylamino-6-(2-thienyl)pteridine.

Similarly using 3.8 g. of 3-thienylacetonitrile in the above procedure 2,7-diamino-4-(β-diethylamino)-ethylamino-6-(3-thienyl)pteridine is obtained.

*Example 6*

A mixture of 2.3 g. of 2,6-diamino-4-[N-methyl-N-(β- dimethylamino)ethyl]amino - 5 - nitrosopyrimidine, prepared from N-methyl-N-(β-dimethylamino)ethylamine by the procedure of Example 1, 1.5 g. of phenylacetonitrile, 0.6 g. of sodium methoxide and 100 ml. of dimethylformamide is heated at reflux for 45 minutes. The reaction mixture is concentrated, treated with water and filtered. The solid product is 2,7-diamino-4-[N-methyl-N-(β-dimethylamino)ethyl]amino-6-phenylpteridine.

*Example 7*

A mixture of 4.0 g. of 2,6-diamino-6-chloropyrimidine, 10 g. of N-aminoethylpiperidine is heated at reflux for four hours. The excess amine is removed in vacuo and the residue is worked up as in Example 1 to give 2,6-diamino-4-(β-piperidino)ethylaminopyrimidine.

A solution of 5.0 g. of the above prepared pyrimidine in 100 ml. of 10% aqueous acetic acid at 70° C. is treated with aqueous solution of 2.0 g. of sodium nitrite. The solution is stirred for five minutes then cooled and filtered. The filtrate is made basic. The solid which separates is 2,6-diamino-4-(β-piperidino)ethylamino-5-nitrosopyrimidine.

A solution of 2.6 g. of 2,6-diamino-4-(β-piperidino)ethylamino-5-nitrosopyrimidine in 100 ml. of dimethylformamide is treated with 0.6 g. of sodium methoxide and 1.2 g. of phenylacetonitrile. The resulting mixture is refluxed for one hour, then concentrated in vacuo and treated with water. The solid which separates is 2,7-diamino-4-(β-piperidino)ethylamino-6-phenylpteridine.

Similarly using N-aminoethylpyrrolidine in the above procedure furnishes 2,7-diamino-4-[β-(N-pyrrolidinyl)]ethylamino-6-phenylpteridine.

*Example 8*

By the procedure of Example 7, 2,6-diamino-4-chloropyrimidine is reacted with N-aminoethylmorpholine and the resulting 2,6-diamino-4-(β-morpholino)ethylaminopyrimidine is treated with sodium nitrite in aqueous acetic acid to give 2,6-diamino-4-(β-morpholino)ethylamino-5-nitrosopyrimidine. A mixture of 2.6 g. of 2,6-diamino-4-(β-morpholino)ethylamino-5-nitrosopyrimidine, 1.2 g. of phenylacetonitrile, 0.6 g. of sodium methoxide and 100 ml. of dimethylformamide is heated at reflux for 45 minutes. Removing the solvent in vacuo, adding water to the residue, filtering and recrystallizing the solid material from isopropanol gives 2,7-diamino-4-(β-morpholino)ethylamino-6-phenylpteridine.

*Example 9*

Reacting N-aminoethyl-N'-methylpiperazine with 2,6-diamino-4-chloropyrimidine and treating the resulting 2,6-diamino - 4 - [N - (N' - methyl)piperazinyl]ethylaminopyrimidine with sodium nitrite in aqueous acetic acid gives 2,6-diamino-4-[N - (N' - methyl)piperazinyl]ethylamino-5-nitrosopyrimidine.

A solution of 2.8 g. of the above prepared pyrimidine in 125 ml. of hot dimethylformamide is treated with 0.6 g. of sodium methoxide and 1.2 g. of phenylacetonitrile. The resulting mixture is heated at reflux for 35 minutes. Working up as in Example 8 gives 2,7-diamino-4-[N-(N'-methyl)piperazinyl]ethylamino-6-phenylpteridine.

*Example 10*

A mixture of 6.8 g. of 4,6-diamino-2-methylthio-5-nitrosopyrimidine and 15 g. of (β-diethylamino)ethylamine in 100 ml. of butanol is heated at reflux for 30 minutes. The mixture is concentrated in vacuo and the residue is recrystallized from aqueous ethanol to give 4,6-diamino-2-diethylaminoethylamino-5-nitrosopyrimidine.

To a hot dimethylformamide solution of 5.0 g. of 4,6-diamino-2-diethylaminoethylamino-5-nitrosopyrimidine is added 1.2 g. of sodium methoxide and 2.4 g. of phenylacetonitrile. The resulting mixture is heated at reflux for one hour. Concentrating, adding water and filtering gives 4,7-diamino - 2 - (β - diethylamino)ethylamino-6-phenylpteridine.

Similarly condensing 5.0 g. of 4,6-diamino-2-diethylaminoethylamino - 5 - nitrosopyrimidine with 3.0 g. of p-methoxyphenylacetonitrile furnishes 4,7-diamino-2-(β-diethylamino)ethylamino-6-(p-methoxyphenyl)pteridine.

*Example 11*

A mixture of 1.0 g. of 2,4-diamino-6-phenyl-7-hydroxypteridine and 5.0 g. of phosphorus pentachloride is refluxed in 50 ml. of phosphorus oxychloride for two hours. The phosphorus oxychloride is removed in vacuo and 50 ml. of ice water is added to the dry residue. The resulting suspension is heated to 100° C. After cooling, the yellow solid is filtered off, washed with water and dissolved in ethanol. Ammonia gas is passed through the solution. Concentrating, cooling and filtering gives 2,4-diamino-7-chloro-6-phenylpteridine.

A solution of 1.8 g. of 2,4-diamino-7-chloro-6-phenylpteridine in dimethylformamide is trated with 2.5 g. of dimethylaminoethylamine. The mixture is heated on a steam bath for two hours, then is concentrated and cooled. The solid material is recrystallized from ethanol to give 2,4-diamino-7-dimethylaminoethylamino - 6 - phenylpteridine.

This invention also includes pharmaceutically acceptable salts of the dialkylaminoalkylaminopteridines of this invention. These salts, which are prepared with nontoxic organic or inorganic acids by methods known to the art, may be employed in place of the free bases as diuretic agents.

What is claimed is:
1. A chemical compound having the following structural formula:

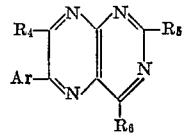

in which Ar is a member of the group consisting of phenyl, tolyl, methoxyphenyl, fluorophenyl and thienyl; two of $R_4$, $R_5$ and $R_6$ are amino and the remaining one of $R_4$, $R_5$ and $R_6$ is

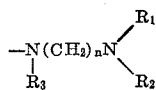

$R_1$ and $R_2$ are members selected from the group consisting of lower alkyl having 1–3 carbon atoms and, when taken together with the nitrogen atom to which they are attached, N-pyrrolidinyl, piperidino, morpholino and N-methylpiperazinyl; $R_3$ is a member selected from the group consisting of hydrogen and methyl and $n$ is an integer selected from the group consisting of 2 and 3.

2. A chemical compound having the following structural formula:

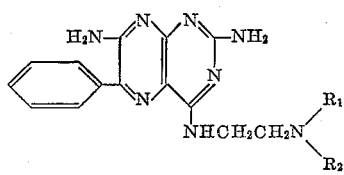

in which $R_1$ and $R_2$ are lower alkyl having 1–3 carbon atoms.

3. A chemical compound having the following structural formula:
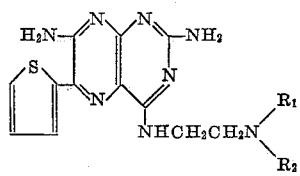
in which $R_1$ and $R_2$ are lower alkyl having 1–3 carbon atoms.
4. A chemical compound having the following structural formula:
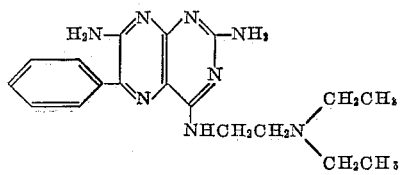
No references cited.